June 10, 1924.

J. M. ASKIN

BATTERY

Filed Feb. 1, 1919

1,497,316

Witnesses:

Inventor
Joseph M. Askin,
By Dyrenforth, Lee, Chritton and Wiles
Attys

Patented June 10, 1924.

1,497,316

UNITED STATES PATENT OFFICE.

JOSEPH M. ASKIN, OF CHICAGO, ILLINOIS, ASSIGNOR TO STUART PRODUCTS CORPORATION, OF CHICAGO, ILLINOIS, A CORPORATION OF ILLINOIS.

BATTERY.

Application filed February 1, 1919. Serial No. 274,389.

*To all whom it may concern:*

Be it known that I, JOSEPH M. ASKIN, a citizen of Russia, residing at Chicago, in the county of Cook and State of Illinois, have invented a new and useful Improvement in Batteries, of which the following is a specification.

My invention relates more particularly to batteries of miniature form and used for flashlights and other similar purposes, though not limited to batteries of miniature form.

In connection with the employment of my invention for miniature batteries, it may be stated as a preface to the following that according to present practices these batteries which are of dry or semi-dry character, are made up at the factory and in such made-up condition are delivered to the dealer, and thus oftentimes a considerable period of time elapses between the date of the manufacture of the battery and the use of the same by the purchaser. Furthermore, a battery begins to deteriorate, even when the circuit is open, as soon as it is made up and this deterioration takes place so rapidly that oftentimes in the ordinary course of business, the battery has become devitalized as much as 50% before it reaches the user.

It is one of my objects to provide for the ready assembling of the parts of a battery by a dealer or purchaser for immediate use by the purchaser, from parts and ingredients furnished to him and which may be sold by the dealer in fresh condition when made up by him or in unassembled condition ready to be assembled, thus giving the purchaser the benefit of a perfectly fresh battery and eliminating loss by shelf deterioration.

Another object is to provide for the formation of a battery, of the general character of batteries as usually provided for flashlights and the like, by what may be termed a cold process, namely, without heating the ingredients forming the electrolyte, as distinguished from what is known as the boiling process which is the common method of manufacturing such batteries and which is made necessary by reason of the inclusion in the mix which forms the electrolyte, of a cereal which is required to be heated to a certain degree in order that it shall cause the electrolyte to be of paste-like consistency; and other objects as will be understood from the following description.

Referring to the accompanying drawing:—

Figure 1:
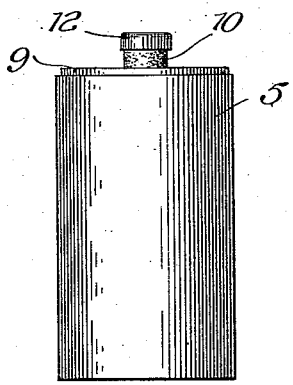
Figure 2:
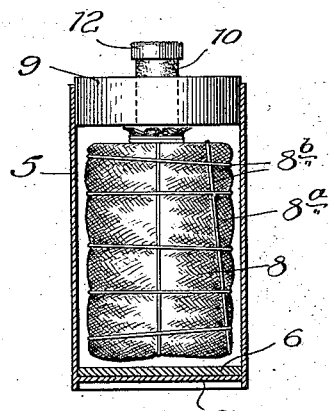
Figure 3:
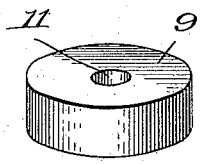
Figure 4:
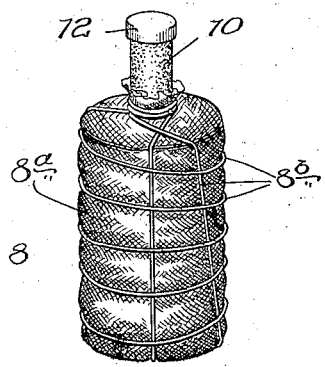

Figure 1 is a view in side elevation of a battery constructed in accordance with my invention. Figure 2 is a view in vertical section of the same. Figure 3 is a perspective view of the head or plug of the battery; and Figure 4, a perspective view of the positive electrode or depolarizer, of the battery.

In the particular embodiment illustrated, the battery comprises a receptacle 5, shown as of cylindrical form, with its bottom closed and its top open, this part of the battery presenting the negative electrode and preferably itself being the electrode. For example, the receptacle 5 may be formed of zinc, and in the particular construction illustrated, a disk 6 of waterproof material rests against the upper side of the bottom 7 of the receptacle which may be of zinc and secured in place in any suitable manner as by soldering it. The positive electrode of the battery is indicated at 8, this electrode being formed as hereinafter described and being held in place within the receptacle 5, in spaced relation throughout its extent, from the wall of the receptacle, by a closure member 9 shown in the form of a head or plug into which, and preferably through which, the upper end of the electrode 8 extends, this head being formed of any suitable material adapting it to be inserted into the open end of the receptacle 5. The head 9 may be made of cork or rubber compound or any other suitable material and in the assembling of the parts of the battery, the head, preferably preliminarily assembled with the electrode 8 to extend at its core 10 into and through the opening hereinafter referred to in the head 9, is introduced into the open end of the receptacle to close it and the closure means being insulated from the receptacle 5 and at the same time it holds the electrode in the position as stated.

The electrode 8 is formed of an inner core 10 of stick carbon as is usual in electrodes of this general type, at which the electrode extends upwardly through an opening 11 in the head 9 and is preferably provided with a metal cap 12, the core 10 being surrounded by a mixture of ingredients, such as commonly provided for this purpose, and formed of graphite, manganese and chloride of zinc solution and in addition sal ammoniac mixed in with these ingredients in the proportion of about 10 to 15% of the total mix of the ingredients by weight, this sal ammoniac being added to the standard mix, for a purpose hereinafter described, and the entire mixture being enveloped in a porous covering 8ª, as for example cheese cloth shown as tied in place by the cord 8ᵇ.

The particular construction of battery illustrated is of the semi-dry type; in other words, the electrolyte in which the electrode 8 is embedded, is of a paste-like consistency, and is formed preferably by mixing the following ingredients together in substantially the following proportions by weight:

| | Per cent. |
|---|---|
| Calcium chloride | 27 |
| Sal ammoniac | 6 |
| Water | 61 |
| Potato starch | 6 |

The calcium-chloride, sal ammoniac and water form the electrolytic solution, and the potato starch serves to cause the solution to be of paste-like consistency to produce the semi-dry condition of the electrolyte, and it will be understood that any other suitable ingredient may be used for reducing the electrolytic solution to paste-like consistency.

In the constructing of the battery as shown, the electrolytic solution with the potato starch or other similar functioning ingredient is introduced into the receptacle 5, by preference the electrolytic solution first, and the potato starch thereafter, and both mixed thoroughly together, and the electrode 8 preferably preliminarily assembled with the head 9 as shown in Fig. 2, introduced into the receptacle 5 and the head into the open end of this receptacle, to cause the electrode 8 to extend into the electrolytic solution in the receptacle and the head 9 to close the upper end of the receptacle and position the electrode as shown in Fig. 2, the electrolytic solution substantially immediately changing from a liquid condition into a paste-like condition without requiring heating of the ingredients.

The provision of the sal ammoniac in the positive-electrode mix as explained, causes the mix to present a high degree of affinity for moisture in the electrolytic solution which is quickly absorbed by the mix upon the introduction of the electrode 8 into the receptacle 5 as stated, whereby the battery becomes conditioned for use almost immediately under any atmospheric temperature upon assembling the parts as stated, which eliminates any necessity for preliminarily soaking the electrode 8 to prepare it for rapid absorption of the moisture in the electrolyte, the rapid conditioning of the battery for immediate use being augmented by the use of the calcium chloride in the electrolyte.

It will be understood from the following that none of the parts of the battery nor the electrolytic solution, nor the material used for changing this solution to paste-like consistency, are subject to deterioration in a state of separation, and thus these various parts and ingredients may be made up separately and retained in the dealer's hands for a long time without in any way impairing them for performing their functions to the maximum degree when assembled, as by the purchaser who, upon assembling the parts and the ingredients, as stated, may produce a perfectly fresh battery, the entire life of which may be utilized in the flashlight or other device in which it is used.

The core 10 preferably extends above the head 9 a sufficient distance to permit it to be grasped by the fingers of a person, for withdrawing the head 9 and electrode 8 from the receptacle, if desired. It will also be noted that by constructing a battery in accordance with my invention, the parts may be disassembled and, if desired, the receptacle used over again with a new inner electrode, to form a fresh battery.

The feature of employing calcium chloride, is of advantage not only in the miniature type of battery stated, and which is intended to be made up by the user, but also in batteries made up by the factory whether of small or large size, not only because calcium chloride is very much cheaper than the material zinc chloride, commonly used, but because the calcium chloride has a refrigerating action which tends to maintain the battery in cool condition and thereby minimize the boiling of the battery to an extent which would cause the electrolyte to ooze through the joints of the battery to the exterior thereof, which often happens with batteries as hitherto provided, especially during hot weather.

While I have disclosed a particular embodiment of my invention, I do not wish to be understood as intending to limit it thereto as various changes and alterations may be made without departing from the spirit of my invention.

What I claim as new and desire to secure by Letters Patent, is:—

1. The method of producing a battery which consists in positioning in a receptacle presenting one of the electrodes of the battery, to contact with said electrode, a mixture of raw ingredients constituting an electrolytic solution and a material having the property of causing the solution to become of paste-like consistency under atmospheric temperature, and while said mixture is in liquid condition positioning the other electrode in said receptacle to extend into the liquid.

2. The method of producing a battery which consists in positioning in a receptacle presenting one of the electrodes of the battery, to contact with said electrode, a mixture of raw ingredients forming an electrolytic solution and potato starch, and while said mixture is in liquid condition positioning the other electrode in said receptacle to extend into the liquid.

3. The method of producing a battery which consists in positioning in a receptacle presenting one of the electrodes of the battery and to contact therewith a mixture of raw ingredients forming an electrolytic solution and potato starch, and positioning the other electrode in said receptacle to extend into said mixture.

4. An electrolyte comprising substantially 29 per cent calcium chloride, 6 per cent of sal ammoniac and 65 per cent of water by weight, mixed together.

JOSEPH M. ASKIN.